United States Patent [19] [11] Patent Number: 4,557,461
Gomi et al. [45] Date of Patent: Dec. 10, 1985

[54] VALVE SEAT

[76] Inventors: Chikashi Gomi; Kohichi Hagiwara, both of 2040, Nagasaka Kamijo, Nagasaka-cho, Kitakoma-gun, Yamanashi-ken, Japan

[21] Appl. No.: 628,965

[22] Filed: Jul. 11, 1984

Related U.S. Application Data

[63] Continuation of Ser. No. 431,075, Sep. 30, 1982, abandoned.

[30] Foreign Application Priority Data

Jan. 9, 1982 [JP] Japan ................... 57-885

[51] Int. Cl.[4] .............................................. F16K 5/06
[52] U.S. Cl. .................................. 251/172; 251/175; 251/315; 251/317
[58] Field of Search ............... 251/315, 317, 172, 175, 251/192

[56] References Cited

U.S. PATENT DOCUMENTS

| 2,930,576 | 3/1960 | Sanctuary | 251/175 |
| 2,963,263 | 12/1960 | Sanctuary | 251/175 |
| 2,989,990 | 6/1961 | Bass et al. | 251/317 |
| 3,118,650 | 1/1964 | Cooper et al. | 251/317 |
| 3,508,736 | 4/1970 | Rhodes et al. | 251/315 |
| 4,236,691 | 12/1980 | Wright | 251/172 |
| 4,385,747 | 5/1983 | Renaud, Jr. et al. | 251/315 |

FOREIGN PATENT DOCUMENTS

| 56-82360 | 7/1981 | Japan . | |
| 1429299 | 3/1976 | United Kingdom | 251/315 |
| 2023773 | 1/1980 | United Kingdom | 251/315 |

OTHER PUBLICATIONS

American Society of Mechanical Engineers, "Pipe Threads (Except Dryseal)", 1968, p. 14.
American Society of Mechanical Engineers, "Malleable Iron Threaded Fittings", 1977, p. 3.
American Petroleum Institute, "Steel Gate Valves, Flanged and Buttwelding Ends", Jan., 1981, p. 5.
American Society of Mechanical Engineers, "Square and Hex Bolts and Screws Inch Series", 1981, pp. 4–5.
American Society of Mechanical Engineers, "Square and Hex Nuts", 1972, pp. 4–5.
Worcester Controls, "Ansi 300# Short Pattern Flanged Ball Valve Series 80", Jan., 1981.
Worcester Controls, "af51/af52 Fire-Rated Ball Valves", Sep. 1981.

Primary Examiner—Martin P. Schwadron
Assistant Examiner—James R. Shay
Attorney, Agent, or Firm—Wenderoth, Lind & Ponack

[57] ABSTRACT

A valve seat for use in a ball valve has a shoulder portion, an elastic lip portion, a circumferential non-contact surface, at least one recess and an intersecting portion. The shoulder portion has an engaging surface on its rear surface which contacts the contact surface of the valve casing perpendicular to the flow passage. The non-contact surface is formed on the rear face of the valve seat between the engaging surface and the lip portion and stepped away from the contact surface. The recess is formed in the shape of a groove in the non-contact surface and has its bottom flush with the rear surface of the lip portion stepped away from the contact surface in such a manner that the lip portion is not thinned so as to ensure sufficient strength of the lip portion. The intersecting portion is disposed between the engaging surface and the non-contact surface. The valve seat thus constructed keeps its sealing function with high efficiency and exhibits high durability under normal conditions and, when the internal pressure of the cavity increases anomalously, provides elasticity for effectively fulfilling its pressure relief function.

3 Claims, 8 Drawing Figures

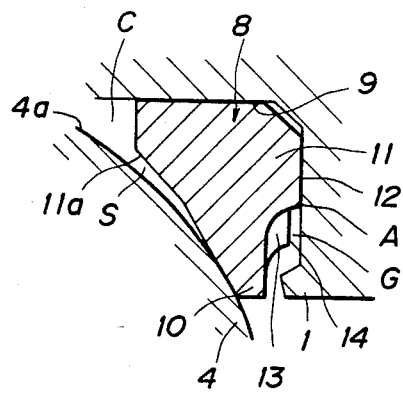
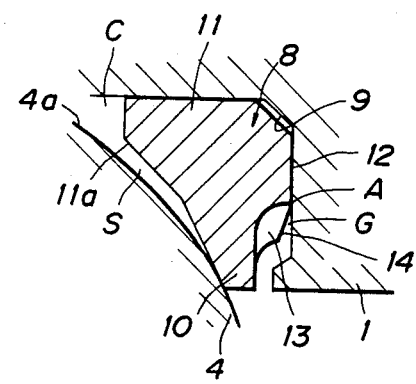
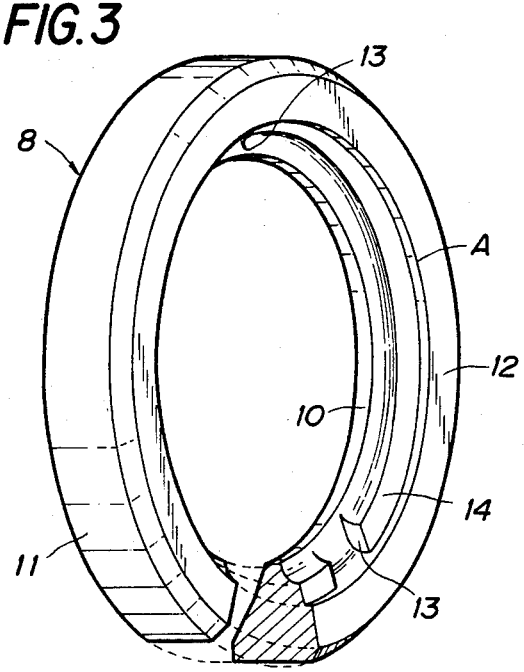

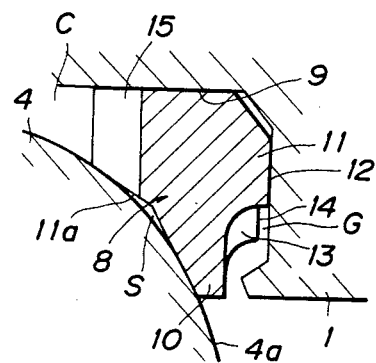
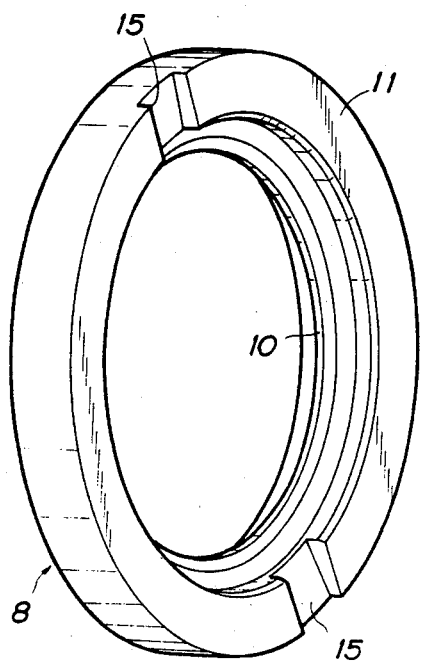

VALVE SEAT

This application is a continuation of now abandoned application Ser. No. 431,075, filed Sept. 30, 1982.

BACKGROUND OF THE INVENTION

1. Field of the Invention

This invention relates to a valve seat adapted to be embedded in a ball valve, which fulfills an effective function of relieving the increased pressure occurring anomalously in a cavity formed between the ball and the valve casing of the ball valve.

2. Description of the Prior Art

In a ball valve wherein the ball having a through passage is securely encased in the valve casing by the use of a pair of valve seats, there is formed a closed narrow cavity among the ball, the valve casing and the paired valve seats. There is a case where a fluid flowing through the ball valve intrudes into the cavity from various sources and the fluid remaining within the closed cavity is expanded or vaporized to excessively increase the pressure within the cavity due to a high temperature fluid which flows through the ball valve or the heat involved from an environmental cause, thereby bringing about deformation or destruction of the valve seat, the valve casing or the ball.

To avoid this situation, there has been proposed a valve seat wherein the lip portion, which comes into partial contact with the ball in the ball valve, is remarkably reduced in thickness to form an easy-to-flex portion for relieving a pressure which increases anomalously in the cavity between the ball and the valve casing. (Refer to Japanese Utility Model Public Disclosure No. 82360/1981, for example.)

Another valve seat of this type which relieves the pressure increased in the cavity by bending the flexible lip portion and permitting the entire seat to be subject to torsional motion has been disclosed in U.S. Pat. No. 4,236,691.

Inevitably, the former valve seat becomes weak in structure due to the thin-walled portions provided on the lip portion. That is, the lip portion of the valve seat, which is in sealing contact with the ball, is partially made thin, meaning that the valve seat is easily deformed even under a light load to reduce the sealing efficiency and is liable to sustain plastic deformation, resulting in requiring an early replacement of the seat in the ball valve.

The latter valve seat cannot ensure sufficient strength in structure because the pressure relieving function is carried out by permitting the entire seat body to be twisted and causing the lip portion thereof to be bent by force of the increased pressure in the cavity of the ball valve. Since the entire seat body suffers large torsional stress at the time the pressure in the cavity increases excessively and the lip portion is necessarily made thin to be endowed with elasticity, this valve seat has less durability and cannot assure the complete sealing for a long time.

Thus, the conventional valve seats including the aforementioned valve seats are disadvantageous in that they are complicated and weak in structure and poor in durability and cannot offer a reliable pressure relief function.

SUMMARY OF THE INVENTION

The object of the present invention is to provide a ball valve seat with a lip portion which comes into tight contact with the ball in order to bring about high sealing efficiency under normal conditions. This invention is capable of effectively relieving the increased pressure occurring anomalously in the cavity formed between the ball and the valve casing and enjoys excellent durability.

In order to achieve the object described above in accordance with the present invention, there is provided a valve seat adapted to space a valve casing having a contact surface perpendicular to the flow passage from a ball of a ball valve so as to form a cavity between the valve casing and the ball. The valve seat comprises a shoulder portion provided on one side thereof with a tapered surface which faces the ball and provided on the other side thereof with an engaging surface which contacts the contact surface of the valve casing perpendicular to the flow passage and which has a radially inner edge, an elastic lip portion integrally formed on the inner circumference of the valve seat, having a uniform thickness so as not to make the leading end thereof creep, having its one side coming into partial contact with the ball and having its other side being stepped away from the contact surface of the valve casing perpendicular to the flow passage, a circumferential non-contact surface projecting from the other side of the lip portion but being stepped away from the contact surface of the valve casing perpendicular to the flow passage, at least one recess means formed in the shape of a groove in the circumferential non-contact surface without giving any change to the configuration of the leading end of the lip portion, and having its bottom flush with the other side of the lip portion stepped away from the contact surface of the valve casing perpendicular to the flow passage, for relieving excess fluid pressure from between the ball and a part of the lip portion close to the recess means, and an interacting portion disposed between the engaging surface of the shoulder portion and the circumferential non-contact surface and located on the radially inner edge of the engaging surface of the shoulder portion.

The provision of the recess means in the circumferential non-contact surface is equivalent to the fact that the lip portion is partially extended outwardly without varying its thickness so as to ensure sufficient strength, thereby bringing about high sealing efficiency under normal conditions, improving the durability of the valve seat, and providing elasticity for effectively fulfilling a pressure relief function when the pressure increases anomalously in the cavity and, whenever the valve seat is rotated slightly, an effective sealing function is performed between the intersecting portion and the contact surface of the valve casing perpendicular to the flow passage without bringing about back leakage of a fluid around the valve seat. Further, in a case where the tapered surface of the shoulder portion is brought into contact with the ball, at least one groove means for communicating the space among the ball, the tapered surface, and the lip portion to the cavity between the ball and the valve casing, is formed on the shoulder portion, thereby ensuring the pressure relief function.

The above objects and other features of the present invention will appear more fully hereinafter from a consideration of the following description taken in connection with the accompanying drawing figures.

BRIEF EXPLANATION OF THE DRAWINGS

FIG. 2 is an expanded sectional view of one preferred embodiment of the valve seat in accordance with the present invention;

FIG. 3 is a perspective view, partially in section, of the valve seat illustrated in FIG. 2;

FIG. 4 is an enlarged fragmentary view of a modified form of the valve seat illustrated in FIG. 2;

FIG. 5 is a perspective view illustrating the front side of the valve seat of FIG. 6;

FIG. 6 is an expanded sectional view of another embodiment of the valve seat in accordance with the present invention;

DESCRIPTION OF THE PREFERRED EMBODIMENTS

Figure 1:
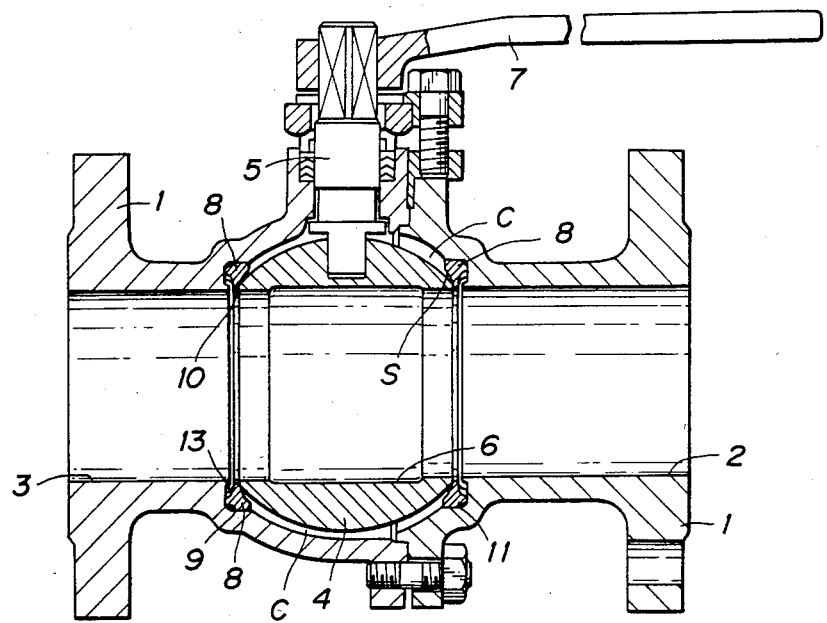
FIG. 1 is an elevational view, in section, of a ball valve incorporating the valve seat according to the present invention.

This invention relates to a valve seat adapted to support a ball within the valve casing of a ball valve in conjunction with another valve seat of the same type. The valve seat of the invention possesses a function of effectively relieving an increase in pressure occurring anomalously in the cavity formed between the ball and the valve casing.

FIGS. 1 to 4 illustrate the first preferred embodiment of the present invention. In the drawings, 1 denotes a valve casing provided on its one side (primary side) with an inlet port 2 and on the other side (secondary side) with an outlet port 3.

By 4 is denoted a ball which is rotatably encased in the valve casing 1 and provided on its upper portion with a stem 5. The ball 4 has a through passage 6 for allowing a fluid to pass therethrough in its open state. When the ball 4 assumes its closed state by operating a lever handle 7, the ball surface 4a of the ball 4 prevents a fluid from passing therethrough.

By 8 is denoted a seat body to be interposed between a stage portion 9 of the valve casing 1 and the ball surface 4a to support the ball 4 in conjunction with another seat body of the same type. The seat body 8 is composed of an elastic lip portion 10 which is integrally formed on the inner circumference of the seat body 8 and has its one side coming into partial contact with the ball and has its other side being stepped away from the contact surface of the valve casing perpendicular to the flow passage. A shoulder portion 11 is provided on one side thereof with a tapered surface 11a which faces the ball surface 4a and provided on the other side thereof with an engaging surface 12 which contacts the contact surface of the valve casing 1 perpendicular to the flow passage and which has a radially inner edge. The tapered surface 11a of the shoulder portion 11 is, in this embodiment, apart from the ball surface 4a across a space S. That is, the space S is defined by the ball surface 4a, the surface of the elastic lip portion 10 kept in contact with the ball surface 4a and the tapered surface 11a of the shoulder portion 11.

A circumferential non-contact surface 14 projects from the side of the lip portion 10 stepped away from the contact surface of the valve casing perpendicular to the flow passage, but is stepped away from the contact surface of the valve casing 1 perpendicular to the flow passage.

Denoted by 13 is at least one recess means which is formed in the shape of a groove in the circumferential non-contact surface 14 in such a manner that the lip portion 10 is not thinned so as to ensure sufficient strength and which has its bottom flush with the other side of the lip portion 10 stepped away from the contact surface of the valve casing 1 perpendicular to the passage, thereby relieving excess fluid pressure from between the ball 4 and a part of the lip portion close to the recess means 13. Though, in the embodiment of FIG. 3, two recess means 13 are formed symmetrically at the upper and lower portions of the seat body 8, the position and the number thereof are not specifically limited.

An intersecting portion A is disposed between the engaging surface 12 of the shoulder portion 11 and the circumferential non-contact surface 14, and is located on the radially inner edge of the engaging surface 12 of the shoulder portion 11.

Two valve seats of the construction described above are fitted into the valve casing to support the ball 4 in an airtight condition, resulting in defining a closed cavity C between the valve casing 1 and the ball 4.

It is permissible to provide the tapered surface 11a and one or more recess means 13 on one or both of the seat bodies 8 embedded in the valve casing 1. In the case that the seat body 8 thus constructed is disposed only on the primary inlet port side 2, increased pressure occurring anomalously in the cavity C can be relieved to the passage of the primary inlet port side 2. If the seat body 8 of this invention is used on both sides of the ball 4, there is no need to take care of the direction in which the ball valve should be installed in a pipe arrangement.

By choosing suitably the length of the recess means 13 in the radial direction, the allowable pressure in the closed cavity C may be determined as desired.

The operation of the valve seat according to the present invention will be described hereinafter.

The ball valve in its open state as illustrated in FIG. 1 is switched to its closed state by rotating the ball 4 by the medium of the lever handle 7 to assume its position in the direction perpendicular to the fluid passage of the ball valve. At this time, the ball 4 is pressed against the valve seat 8 on the secondary outlet port side 3, resulting in bringing the ball surface 4a into intimate contact with the contact region of the lip portion 10 to exert the sealing effect. On the other hand, the lip portion 10 of the valve seat 8 on the primary inlet port side 2 comes into sealing contact with the ball surface 4a.

In this condition, when the pressure in the cavity C increases anomalously due to a temperature rise or evaporation of the fluid intruding into the cavity C, the increased pressure forces the lip portion 10 of the valve seat 8 on the primary inlet port side 2 to be opened to allow escape of the pressurized fluid via the space S, thereby, also allowing the passage of the increased pressure through only part of the lip portion 10 in contact with the ball surface 4a and where the recess means 13 is formed.

Consequently, the pressure in the cavity C can be maintained within the allowable range, thereby preventing a lowering of efficiency of the ball valve. Under normal conditions, the entire portion 10, i.e. not only the aforementioned part thereof where the recess means 13 is formed but also the remaining part thereof where the recess means 13 is not formed, keeps securely in airtight contact with the ball surface 4a.

The valve seat according to the present invention exhibits an effective function of relieving the increased pressure in the cavity C formed between the ball 4 and the valve casing 1. Besides, compared with the conventional valve seat, it is sturdy in structure and excellent in durability and efficiency.

The non-contact surface 14 illustrated in FIG. 2 has a stepped plane perpendicular to the central longitudinal axis of the valve casing 1, and, as illustrated in FIG. 4, has a plane tapered in relation to the same axis.

As the result of providing the non-contact surface 14 such as the stepped plane or tapered plane inclusive of the recess means 13, a gap G is formed between the contact surface of the stage portion 9 of the valve casing 1 and the non-contact surface 14, thereby permitting the seat body 8 to be slightly rotated about the intersecting portion A in the counterclockwise direction in FIGS. 2 and 4 when the ball 4 assumes its closed state and is then pressed against the lip portion 10 of the seat body 8 of the secondary outlet port side 3 with greater force than that under normal conditions. Consequently, the innermost edge of the engaging surface 12 of the seat body 8, i.e. the intersecting portion A, comes into intimate contact with the contact surface of the stage portion 9 of the valve casing 1 thereby exerting an effective sealing function on the intersecting portion A without bringing about back leakage of a fluid which occurs between the stage portion 9 and the seat body 8.

Also, the seat body 8 on the primary inlet port side 2, which seat body 8 is embedded in the valve casing 1 in such a state that the lip portion 10 is pressed against the ball surface 4a, contributes to seal the closed cavity C by causing the intersecting portion A of the engaging surface 12 to be in strong contact with the contact surface of the stage portion 9.

If there is no circumferential non-contact surface 14 and consequently if there is no gap G between the stage portion 9 of the valve casing 1 and the seat body 8, the recess means 13 is formed on the engaging surface 12. In this case, the seat body 8 is rotated with an intersecting portion, which is between the engaging surface of the shoulder portion and the portion of the lip portion stepped away from the contact surface of the valve casing perpendicular to the flow passage, as a fulcrum. The inersecting portion as a fulcrum in this case corresponds to the innermost portion of the engaging surface of the shoulder portion and is circumferentially disconnected due to the presence of the recess means and, therefore, the portion of the intersecting portion having the recess means formed therein cannot come into sealing contact with the stage portion 9. As a result, there is a possibility of sustaining back leakage of a fluid.

The second preferred embodiment according to the present invention will be described hereinafter with reference to FIGS. 5 and 6. This embodiment is a modification of the aforementioned first embodiment illustrated in FIGS. 2 and 3, wherein like reference characters designate like or corresponding parts throughout.

In this second embodiment, the tapered surface 11a of the shoulder portion 11 comes, at its outward end portion, into circumferential contact with the ball surface 4a, and is apart therefrom at the inward portion in the vicinity of the lip portion 10 to form a space S.

Denoted by 15 is a communicating groove for communicating the space S to the closed cavity C. While two communicating grooves 15 are formed vertically symmetrically on the side facing the ball 4 as illustrated in FIG. 5, the number and the position of the communicating groove 15 may nevertheless be optically determined. Further, the communicating groove 15 as well as the recess portion 13 may be provided on one or both of the seat bodies 8 by which the ball 4 is supported inside the valve casing 1.

According to the valve seat of this embodiment, the ball 4 is stably supported by means of the tapered surface 11a of the shoulder portion 11, and besides, an effective function of relieving the increased pressure within the cavity C can be expected by the aid of the communicating groove 15, similarly to the former embodiment.

Figure 7A:
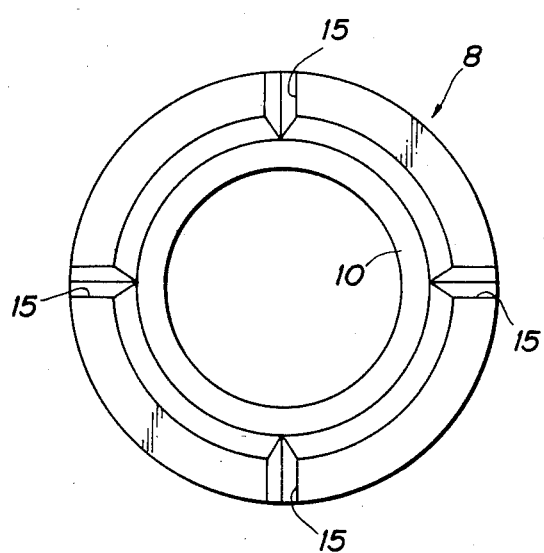
FIGS. 7(A) and 7(B) are a front view and a side view of still another embodiment of the valve seat in accordance with the present invention.
Figure 7B:
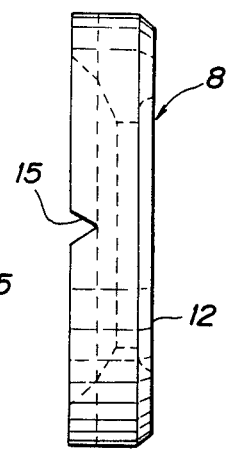

Though the respective communicating grooves 15 of the aforementioned embodiments are formed in a rectangular shape in section, it may be formed in the shape of the letter U. Four communicating grooves formed in the shape of the letter V are provided on the shoulder portion 11 of the seat body as illustrated in FIGS. 7(A) and 7(B). As one example, a plurality of communicating grooves 15 as described above may be formed on the conventional valve seat, having no recess means as indicated by 13 in the present invention. Consequently, the pressure relief efficiency thereof is improved to some extent.

As is plain from the foregoing description, the valve seat according to the present invention, which is formed with the recess means 13 without reducing in thickness the lip portion 10 to invest the lip portion 10 with sufficient elasticity, is sturdy in structure and guaranteesd excellent pressure relief efficiency, compared with the conventional valve seat, in the case where a fluid intruder into the closed cavity C of the ball valve and is expanded or vaporized, resulting in increasing the pressure in the cavity C.

As many apparently widely different embodiments of this invention may be made without departing from the spirit and scope thereof, it is to be understood that the invention is not limited to the specific embodiments thereof, except as defined in the appended claims.

What is claimed is:

1. A toroidal valve seat for placement in a flow passage, said valve seat being adapted to space a valve casing having a contact surface perpendicular to the flow passage from a ball of a ball valve, so as to form a cavity between the valve casing and the ball, which valve seat comprises:
   a shoulder portion provided on one side thereof with a tapered surface which faces the ball and provided on the other side thereof with an engaging surface which contacts the contact surface of the valve casing perpendicular to the flow passage and which has a radially inner edge;
   an elastic lip portion integrally formed on the inner circumference of the valve seat, said lip portion having a uniform thickness so as not to make the leading end thereof creep, having its one side coming into partial contact with the ball and having its other side being stepped away from the contact surface of the valve casing perpendicular to the flow passage;
   a circumferential non-contact surface projecting from the other side of the lip portion but being stepped away from the contact surface of the valve casing perpendicular to the flow passage;
   at least one recess means, being formed in the shaped of a groove in the circumferential non-contact surface without giving any change to the configuration of the leading end of said lip portion, and having its bottom flush with the other side of the lip portion stepped away from the contact surface of the valve casing perpendicular to the flow passage, for relieving excess fluid pressure from between the ball and a part of the lip portion close to the recess means; and an intersecting portion disposed between the engaging surface of the shoulder portion and the circumferential non-contact surface, said intersecting portion being located on the radially inner edge of the engaging surface of the shoulder portion;

whereby, whenever the valve seat is rotated slightly, an effective sealing function is performed between the intersecting portion and the contact surface of the valve casing perpendicular to the flow passage without bringing about back leakage of a fluid around the valve seat.

2. The valve seat according to claim 1, wherein: said tapered surface of said shoulder portion is separated from the ball so as to form a space open to the cavity between the ball and the valve casing.

3. The valve seat according to claim 1, wherein: said tapered surface of said shoulder portion is in partial contact with the ball to form a space among the ball, the tapered surface and said lip portion and is provided with at least one groove means which communicates said space with the cavity between the valve casing and the ball.

* * * * *